(12) United States Patent
Danilov et al.

(10) Patent No.: US 11,023,130 B2
(45) Date of Patent: Jun. 1, 2021

(54) DELETING DATA IN A GEOGRAPHICALLY DIVERSE STORAGE CONSTRUCT

(71) Applicant: EMC IP Holding Company LLC, Hopkinton, MA (US)

(72) Inventors: Mikhail Danilov, Saint Petersburg (RU); Alexander Elpaev, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/010,255

(22) Filed: Jun. 15, 2018

(65) Prior Publication Data

US 2019/0384500 A1 Dec. 19, 2019

(51) Int. Cl.
*G06F 3/06* (2006.01)

(52) U.S. Cl.
CPC ............ *G06F 3/0608* (2013.01); *G06F 3/067* (2013.01); *G06F 3/0652* (2013.01)

(58) Field of Classification Search
CPC ....... G06F 3/0608; G06F 3/0652; G06F 3/067
See application file for complete search history.

(56) References Cited

U.S. PATENT DOCUMENTS

| | | | |
|---|---|---|---|
| 5,675,802 A | 10/1997 | Allen et al. | |
| 5,805,788 A | 9/1998 | Johnson | |
| 5,950,225 A | 9/1999 | Kleiman | |
| 6,502,243 B1 | 12/2002 | Thomas | |
| 7,389,393 B1 | 6/2008 | Karr et al. | |
| 7,577,091 B2 | 8/2009 | Antal et al. | |
| 7,631,051 B1 | 12/2009 | Fein et al. | |
| 7,664,839 B1 | 2/2010 | Karr et al. | |
| 7,680,875 B1 | 3/2010 | Shopiro et al. | |
| 7,721,044 B1 | 5/2010 | Chatterjee et al. | |
| 8,125,406 B1 | 2/2012 | Jensen et al. | |
| 8,261,033 B1 | 9/2012 | Slik et al. | |
| 8,370,542 B2 | 2/2013 | Lu et al. | |
| 8,479,037 B1 | 7/2013 | Chatterjee et al. | |
| 8,495,465 B1 | 7/2013 | Anholt et al. | |
| 8,540,625 B2 | 9/2013 | Miyoshi | |

(Continued)

OTHER PUBLICATIONS

Muralidhar et al. "f4: Facebook's Warm BLOB Storage System." Oct. 6-8, 2014. pp. 383-398. (Year: 2014).*

(Continued)

*Primary Examiner* — Aracelis Ruiz

(74) *Attorney, Agent, or Firm* — Amin, Turocy & Watson, LLP

(57) ABSTRACT

Deletion of data stored via a geographically diverse storage is disclosed. In response to determining that a first chunk and a second chunk of a first zone are to be deleted, a portion of the first and second chunks can be received at a second zone comprising a third and fourth chunk. The third chunk can comprise data represented by the first chunk and the fourth chunk can comprise data represented by the second chunk. The portion of the first and second chunks, and the third and the fourth chunks can be employed in generating a fifth chunk that comprises data from the third and fourth chunks other than data represented in the first and second chunks. In an aspect the portion of the first and second chunks can be received via a sixth chunk generated at the first zone.

20 Claims, 10 Drawing Sheets

(56) References Cited

U.S. PATENT DOCUMENTS

| | | |
|---|---|---|
| 8,751,599 B2 | 6/2014 | Tran et al. |
| 8,751,740 B1 | 6/2014 | De Forest et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,496,330 B1 | 12/2019 | Bernat et al. |
| 10,503,611 B1 * | 12/2019 | Srivastav ............. G06F 3/067 |
| 10,567,009 B2 | 2/2020 | Yang et al. |
| 10,579,490 B2 | 3/2020 | Danilov et al. |
| 10,613,780 B1 | 4/2020 | Naeni et al. |
| 10,733,053 B1 | 8/2020 | Miller et al. |
| 10,797,863 B2 | 10/2020 | Chen et al. |
| 2002/0166026 A1 | 11/2002 | Ulrich et al. |
| 2002/0191311 A1 | 12/2002 | Ulrich et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0164430 A1 | 6/2014 | Hadjieleftheriou et al. |
| 2014/0164694 A1 | 6/2014 | Storer |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0178007 A1 | 6/2015 | Moisa et al. |
| 2015/0186043 A1 | 7/2015 | Kesselman et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1 | 11/2016 | Baptist et al. |
| 2016/0357649 A1 | 12/2016 | Karrotu et al. |
| 2016/0371145 A1 * | 12/2016 | Akutsu ............. G06F 3/067 |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0116088 A1 | 4/2017 | Anami et al. |

(56) References Cited

U.S. PATENT DOCUMENTS

| | | | |
|---|---|---|---|
| 2017/0187398 A1 | 6/2017 | Trusov | |
| 2017/0187766 A1 | 6/2017 | Zheng et al. | |
| 2017/0206025 A1 | 7/2017 | Viswanathan | |
| 2017/0206135 A1 | 7/2017 | Zeng | |
| 2017/0212680 A1* | 7/2017 | Waghulde | G06F 3/0625 |
| 2017/0212845 A1 | 7/2017 | Conway | |
| 2017/0235507 A1 | 8/2017 | Sinha et al. | |
| 2017/0262187 A1 | 9/2017 | Manzanares et al. | |
| 2017/0268900 A1 | 9/2017 | Nicolaas et al. | |
| 2017/0285952 A1 | 10/2017 | Danilov et al. | |
| 2017/0286009 A1 | 10/2017 | Danilov et al. | |
| 2017/0286436 A1 | 10/2017 | Neporada et al. | |
| 2017/0286516 A1 | 10/2017 | Horowitz et al. | |
| 2017/0288701 A1 | 10/2017 | Slik et al. | |
| 2017/0344285 A1 | 11/2017 | Choi et al. | |
| 2018/0052744 A1 | 2/2018 | Chen et al. | |
| 2018/0063213 A1 | 3/2018 | Bevilacqua-Linn et al. | |
| 2018/0074881 A1 | 3/2018 | Burden | |
| 2018/0121286 A1 | 5/2018 | Sipos | |
| 2018/0129417 A1 | 5/2018 | Sivasubramanian et al. | |
| 2018/0181324 A1 | 6/2018 | Daniliv et al. | |
| 2018/0181475 A1 | 6/2018 | Danilov et al. | |
| 2018/0181612 A1 | 6/2018 | Daniliv et al. | |
| 2018/0246668 A1 | 8/2018 | Sakashita et al. | |
| 2018/0267856 A1* | 9/2018 | Hayasaka | G06F 3/067 |
| 2018/0267985 A1 | 9/2018 | Badey et al. | |
| 2018/0306600 A1 | 10/2018 | Nicolaas et al. | |
| 2018/0307560 A1 | 10/2018 | Vishnumolakala et al. | |
| 2018/0341662 A1 | 11/2018 | He | |
| 2018/0375936 A1 | 12/2018 | Chirammal et al. | |
| 2019/0028179 A1 | 1/2019 | Kalhan | |
| 2019/0034084 A1 | 1/2019 | Nagarajan et al. | |
| 2019/0043201 A1 | 2/2019 | Strong et al. | |
| 2019/0043351 A1 | 2/2019 | Yang et al. | |
| 2019/0050301 A1 | 2/2019 | Juniwal et al. | |
| 2019/0065092 A1 | 2/2019 | Shah et al. | |
| 2019/0065310 A1 | 2/2019 | Rozas | |
| 2019/0114223 A1 | 4/2019 | Pydipaty et al. | |
| 2019/0205437 A1 | 7/2019 | Larson et al. | |
| 2019/0215017 A1 | 7/2019 | Danilov et al. | |
| 2019/0220207 A1 | 7/2019 | Lingarajappa | |
| 2019/0356416 A1 | 11/2019 | Yanovsky et al. | |
| 2019/0384500 A1 | 12/2019 | Danilov et al. | |
| 2019/0386683 A1 | 12/2019 | Danilov et al. | |
| 2020/0026810 A1 | 1/2020 | Subramaniam et al. | |
| 2020/0042178 A1 | 2/2020 | Danilov et al. | |
| 2020/0050510 A1 | 2/2020 | Chien et al. | |
| 2020/0104377 A1 | 4/2020 | Earnesty, Jr. et al. | |
| 2020/0117556 A1 | 4/2020 | Zou et al. | |

OTHER PUBLICATIONS

Non-Final Office Action received for U.S. Appl. No. 15/794,950 dated Jul. 9, 2019, 29 pages.
Non-Final Office Action received for U.S. Appl. No. 15/952,179 dated Sep. 10, 2019, 42 pages.
Final Office Action received for U.S. Appl. No. 15/651,504 dated Sep. 18, 2019, 15 pages.
Office Action dated Nov. 16, 2018 for U.S. Appl. No. 15/662,273, 19 pages.
Non-Final Office Action received for U.S. Appl. No. 15/651,504 dated Mar. 21, 2019, 10 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Final Office Action dated Feb. 12, 2020 for U.S. Appl. No. 16/024,314, 29 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.

(56) References Cited

OTHER PUBLICATIONS

Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science)#Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Office Action received for U.S. Appl. No. 16/010,246 dated Jul. 27, 2020 36 pages.
Non-Final Office Action received for U.S. Appl. No. 16/526,142 dated Oct. 15, 2020, 21 pages.
Notice of Allowance received U.S. Appl. No. 16/228,612 dated Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.
EMC; "EMC ECS (Elastic Cloud Storage) Architectural Guide v2.x;" EMC; Jun., 2015; available at: https://www.dell.com/community/s/vjauj58549/attachments/vjauj58549/solutions-ch/477/1/h14071-ecs-architectural-guide-wp.pdf, Jun. 2015, 21 pages.
Mohan et al., "Geo-aware erasure coding for high-performance erasure-coded storage clusters", Springer Link, URL: https://link.springer.com/article/10.1007/s 12243-017-0623-2, Jan. 18, 2018.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Dell Technologies, "ECS Overview and Architecture", h14071.18, Feb. 2021, 55 pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.

\* cited by examiner ical field

DELETING DATA IN A GEOGRAPHICALLY DIVERSE STORAGE CONSTRUCT

TECHNICAL FIELD

The disclosed subject matter relates to data convolution, more particularly, to deleting convolved data blocks among geographically diverse storage devices.

BACKGROUND

Conventional data storage techniques can employ convolution and deconvolution of data to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage.

DETAILED DESCRIPTION

Figure 1:
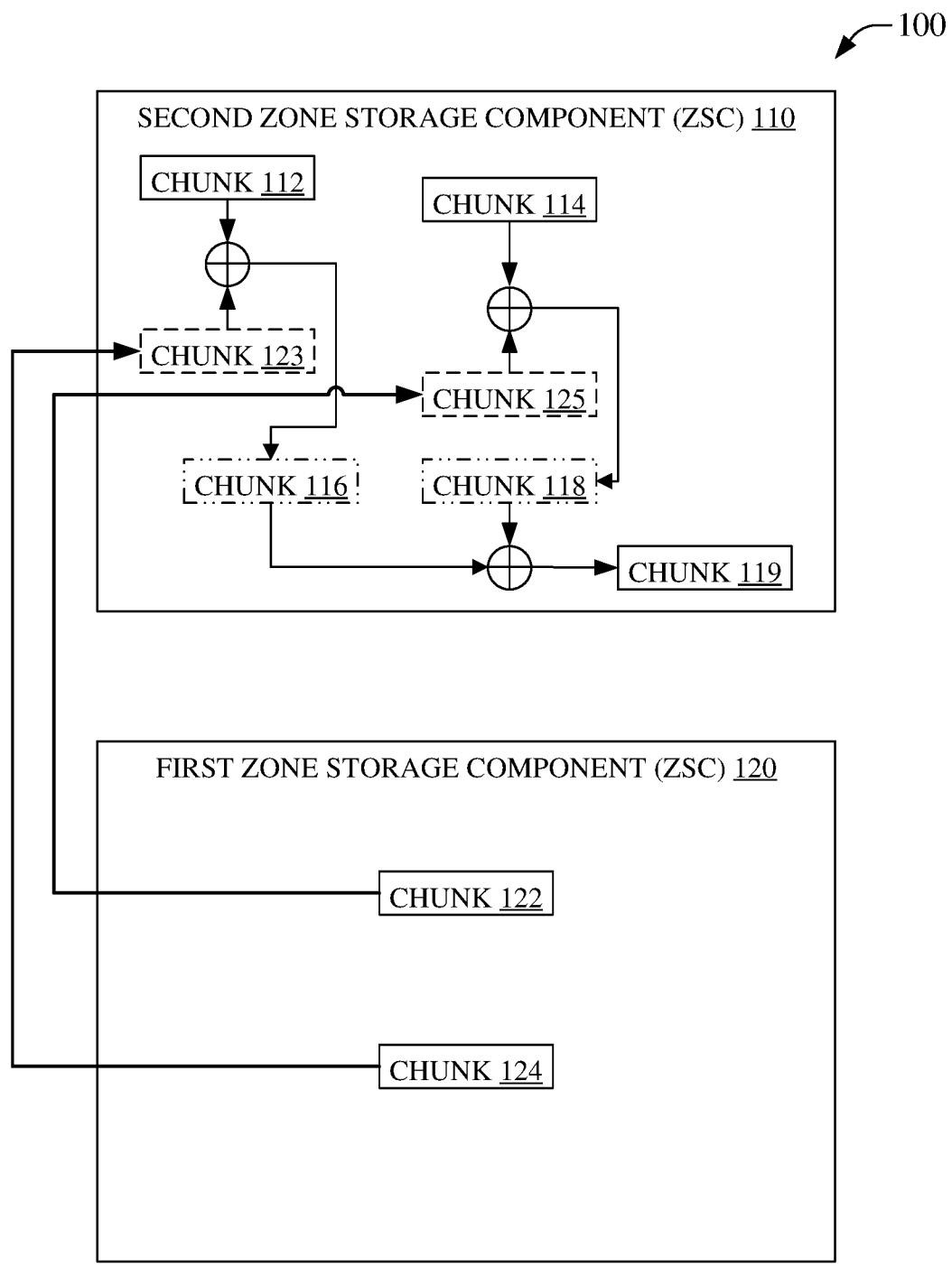
FIG. 1 is an illustration of an example system that can facilitate deleting convolved data with first inter-zone resource consumption in a geographically diverse storage construct, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can employ convolution and deconvolution to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage. Examples of bulk data storage can include networked storage, e.g., cloud storage, for example Elastic Cloud Storage offered by Dell EMC. Bulk storage can, in an aspect, manage disk capacity via partitioning of disk space into blocks of fixed size, frequently referred to as chunks, for example a 128 MB chunk, etc. Chunks can be used to store user data, and the chunks can be shared among the same or different users, for example, one chunk may contain fragments of several user objects. A chunk's content can generally be modified in an append-only mode to prevent overwriting of data already added to the chunk. As such, when a typical chunk becomes full enough, it can be sealed so that the data therein is generally not able for further modification. These chunks can be then stored in a geographically diverse manner to allow for recovery of the data where a first copy of the data is destroyed, e.g., disaster recovery, etc. Blocks of data, hereinafter 'data chunks', or simply 'chunks', can be used to store user data. Chunks can be shared among the same or different users, e.g., a typical chunk can contain fragments of different user data objects. Chunk contents can be modified, for example, in an append-only mode to prevent overwriting of data already added to the chunk, etc. As such, for a typical append-only chunk that is determined to be full, the data therein is generally not able to be further modified. Eventually the chunk can be stored 'off-site', e.g., in a geographically diverse manner, to provide for disaster recovery, etc. Chunks from a data storage device, e.g., 'zone storage component' (ZSC), 'zone storage device' (ZSD), etc., located in a first geographic location, hereinafter a 'zone', etc., can be stored in a second zone storage device that is located at a second geographic location different from the first geographic location. This can enable recovery of data where the first zone storage device is damaged, destroyed, offline, etc., e.g., disaster recovery of data, by accessing the off-site data from the second zone storage device.

Geographically diverse data storage can use data compression to store data. As an example, a storage device in Topeka can store a backup of data from a first zone storage device in Houston, e.g., Topeka can be considered geographically diverse from Houston. As a second example, data chunks from Seattle and San Jose can be stored in Denver. The example Denver storage can be compressed or uncompressed, wherein uncompressed indicates that the Seattle and San Jose chunks are replicated in Denver, and wherein compressed indicates that the Seattle and San Jose chunks are convolved, for example via an 'XOR' operation, into a different chunk to allow recovery of the Seattle or San Jose data from the convolved chunk, but where the convolved chunk typically consumes less storage space than the sum of the storage space for both the Seattle and San Jose chunks individually. In an aspect, compression can comprise convolving data and decompression can comprise deconvolving data, hereinafter the terms compress, compression, convolve, convolving, etc., can be employed interchangeably unless explicitly or implicitly contraindicated, and similarly, decompress, decompression, deconvolve, deconvolving, etc., can be used interchangeably. Compression, therefore, can allow original data to be recovered from a compressed chunk that consumes less storage space than storage of the uncompressed data chunks. This can be beneficial in that data from a location can be backed up by redundant data in another location via a compressed chunk, wherein a redundant data chunk can be smaller than the sum of the data chunks contributing to the compressed chunk. As such, local chunks, e.g., chunks from different zone storage devices, can be compressed via a convolution technique to reduce the amount of storage space used by a compressed chunk at a geographically distinct location.

A convolved chunk stored at a geographically diverse storage device can comprise data from some or all storage devices of a geographically diverse storage system. As an example, where there are five storage devices, a first storage device can convolve chunks from the other four storage devices to create a 'backup' of the data from the other four storage devices. In this example, the first storage device can create a backup chunk from chunks received from the other four storage devices. In an aspect, this can result in generating copies of the four received chunks at the first storage device and then convolving the four chunks to generate a fifth chunk that is a backup of the other four chunks. Moreover, one or more other copies of the four chunks can be created at the first storage device for redundancy. In another example, the first storage device can convolve chunks from three of the other four storage devices.

In an embodiment of the disclosed subject matter, a first data chunk and a second data chunk corresponding to a first and second zone that are geographically diverse can be stored in a third data chunk stored at third zone that is geographically diverse from the first and second zones. In an aspect the third chunk can represent the data of the first and second data chunks in a compressed form, e.g., the data of the first data chunk and the second data chunk can be convolved, such as by an XOR function, into the third data chunk. In an aspect, first data of the first data chunk and second data of the second data chunk can be convolved with or without replicating the entire first data chunk and the entire second data chunk at data store(s) of the third zone, e.g., as at least a portion of the first data chunk and at least a portion of the second data chunk are received at the third zone, they can be convolved to form at least a portion of the third data chunk. In an aspect, where compression occurs without replicating a chunk at another zone prior to compression, this can be termed as 'on-arrival data compression' and can reduce the count of replicate data made at the third zone and data transfers events can correspondingly also be reduced. In an aspect, a ZSC can comprise one or more data storage components that can be communicatively coupled, e.g., a ZSC can comprise one data store, two or more communicatively coupled data stores, etc. In an aspect, this can allow replication of data in the ZSC and can provide data redundancy in the ZSC, for example, providing protection against loss of one or more data stores of a ZSC. As an example, a ZSC can comprise multiple hard drives and a chunk can be stored on more than one hard drive such that, if a hard drive fails, other hard drives of the ZSC can comprise the chunk, or a replicate of the chunk.

In an aspect, as data in chunks becomes stale, old, redundant, etc., it can be desirable to delete these chunks to free storage space for other uses. In an aspect, a convolved chunk can be de-convolved, partially or completely, to yield other chunks, e.g., the other chunks can represent the same data as the convolved chunk but can typically consume more storage space because these other chunks are less highly convolved. As an example, the chunk (AB(CD)), which can be chunk A convolved with Chunk B convolved with a chunks that itself is a convolution of chunks C and D, can be deconvolved into chunks A to D, into chunks A, B, and (CD), into chunks A and B(CD), etc. Moreover, in this example, because the convolution can be commutative, such as where an XOR function is used to convolve/deconvolve the data, the chunk (AB(CD)) can be deconvolved into, for example, chunks B and A(CD), chunks A, D, and (BC), etc. Where a chunk is to be deleted in a remote zone, the deconvolution can comprise transfer of other chunks to facilitate the deconvolution. As an example, where the chunk (AB(CD)) is at a first zone, and chunk D is to be deleted, data for chunks A, B, and C, can be replicated in the first zone from other zones to allow deconvolution, e.g., (AB(CD)) XOR (ABC), where data for chunks A, B, and C, is replicated into the first zone can result in chunks (ABC) and D, such that chunk D can be deleted and leave just chunk (ABC) at the first zone. As such, it can be desirable to reduce the resource consumption in replicating chunks between zones to facilitate the deletion of a chunk from a convolved chunk. As an example, it can consume less bandwidth to replicate chunk (ABC) from a second zone to the example first zone as compared to replicating each of chunk A, chunk B, and chunk C from the second zone to the first zone. This can be accommodated, for example, by first, in the second zone, generating a compressed chunk (ABC), such as from chunks A, B, and C, from chunk AB and chunk C, from chunk AC and chunk B, etc., prior to replicating generated chunk ABC into the first zone.

In an aspect, compression/convolution of chunks can be performed by different compression/convolution technologies. Logical operations can be applied to chunk data to allow compressed data to be recoverable, e.g., by reversing the logical operations to revert to an earlier form of chunk data. As an example, data from chunk 1 can undergo an exclusive-or operation, hereinafter 'XOR', with data from chunk 2 to form chunk 3. This example can be reversed by XORing chunk 3 with chunk 2 to generate chunk 1, etc. While other logical and/or mathematical operations can be employed in compression of chunks, those operations are generally beyond the scope of the presently disclosed subject matter and, for clarity and brevity, only the XOR operator will be illustrated herein. However, it is noted that the disclosure is not so limited and that those other operations or combinations of operations can be substituted without departing from the scope of the present disclosure. As such, all logical and/or mathematical operations for compression germane to the disclosed subject matter are to be considered within the scope of the present disclosure even where not explicitly recited for the sake of clarity and brevity.

In an aspect, the presently disclosed subject matter can include 'zones'. A zone can correspond to a geographic location or region. As such, different zones can be associated with different geographic locations or regions. As an example, Zone A can comprise Seattle, Wash., Zone B can comprise Dallas, Tex., and, Zone C can comprise Boston, Mass. In this example, where a local chunk from Zone A is replicated, e.g., compressed or uncompressed, in Zone C, an earthquake in Seattle can be less likely to damage the replicated data in Boston. Moreover, a local chunk from Dallas can be convolved with the local Seattle chunk, which can result in a compressed/convolved chunk, e.g., a partial or complete chunk, which can be stored in Boston. As such, either the local chunk from Seattle or Dallas can be used to de-convolve the partial/complete chunk stored in Boston to recover the full set of both the Seattle and Dallas local data chunks. The convolved Boston chunk can consume less disk space than the sum of the Seattle and Dallas local chunks. An example technique can be "exclusive or" convolution, hereinafter 'XOR', '⊕', etc., where the data in the Seattle and Dallas local chunks can be convolved by XOR processes to form the Boston chunk, e.g., $C=A1 \oplus B1$, where A1 is a replica of the Seattle local chunk, B1 is a replica of the Dallas local chunk, and C is the convolution of A1 and B1. Of further note, the disclosed subject matter can further be employed in more or fewer zones, in zones that are the same or different than other zones, in zones that are more or less geographically diverse, etc. As an example, the disclosed subject matter can be applied to data of a single disk, memory, drive, data storage device, etc., without departing from the scope of the disclosure, e.g., the zones represent different logical areas of the single disk, memory, drive, data storage device, etc. Moreover, it will be noted that convolved chunks can be further convolved with other data, e.g., $D=C1 \oplus E1$, etc., where E1 is a replica of, for example, a Miami local chunk, E, C1 is a replica of the Boston partial chunk, C, from the previous example and D is an XOR of C1 and E1 located, for example, in Fargo.

In an aspect, XORs of data chunks in disparate geographic locations can provide for de-convolution of the XOR data chunk to regenerate the input data chunk data. Continuing a previous example, the Fargo chunk, D, can be de-convolved into C1 and E1 based on either C1 or D1; the Miami chunk, C, can be de-convolved into A1 or B1 based on either A1 or B1; etc. Where convolving data into C or D comprises deletion of the replicas that were convolved, e.g., A1 and B1, or C1 and E1, respectively, to avoid storing both the input replicas and the convolved chunk, de-convolution can rely on retransmitting a replica chunk that so that it can be employed in de-convoluting the convolved chunk. As an example the Seattle chunk and Dallas chunk can be replicated in the Boston zone, e.g., as A1 and B1. The replicas, A1 and B1 can then be convolved into C. Replicas A1 and B1 can then be deleted because their information is redundantly embodied in C, albeit convolved, e.g., via an XOR process, etc. This leaves only chunk C at Boston as the backup to Seattle and Dallas. If either Seattle or Dallas is to be recovered, the corollary input data chunk can be used to de-convolve C. As an example, where the Seattle chunk, A, is corrupted, the data can be recovered from C by de-convolving C with a replica of the Dallas chunk B. As such, B can be replicated by copying B from Dallas to Boston as B1, then de-convolving C with B1 to recover A1, which can then be copied back to Seattle to replace corrupted chunk A.

In some circumstances, disk space management can seek to recover underutilized disk space. As an example, where the Seattle chunk, A, is to be deleted, recovery of the Dallas chunk, B, via Boston convolved chunk, C, becomes dependent on having a copy of B to de-convolve C with after A has been deleted. As such, it can be desirable to de-convolve C into A1 and B1 prior to deleting A and A1, such that B1 can be convolved with another chunk, for example Miami chunk, E. As such, recovery of B1 can be based on E1 and the XOR of B1E1. Also of note, to de-convolve C in to A1 and B1, a replica of A, e.g., A1 is made in Boston, this allows recovery of B1. Once B1 is recovered, C, A1, and A can be deleted. Then B1 can be convolved with E1. It will be noted that data is transferred, e.g., A is copied into A1 from Seattle to Boston, to allow C to be de-convolved.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate deleting convolved data with first inter-zone resource consumption in a geographically diverse storage construct, in accordance with aspects of the subject disclosure. System 100 can comprise zone storage components (ZSCs), e.g., first ZSC 110, second ZSC 120, etc. The ZSCs can communicate with the other ZSCs of system 100. A zone can correspond to a geographic location or region. As such, different zones can be associated with different geographic locations or regions. A ZSC can comprise one or more data stores in one or more locations. In an aspect, a ZSC can store at least part of a data chunk on at least part of one data storage device, e.g., hard drive, flash memory, optical disk, server storage, etc. Moreover, a ZSC can store at least part of one or more data chunks on one or more data storage devices, e.g., on one or more hard disks, across one or more hard disks, etc. As an example, a ZSC can comprise one or more data storage devices in one or more data storage centers corresponding to a zone, such as a first hard drive in a first location proximate to Miami, a second hard drive also proximate to Miami, a third hard drive proximate to Orlando, etc., where the related portions of the first, second, and third hard drives correspond to, for example, a 'Florida zone', 'Southeastern United States zone', etc.

In an aspect, data chunks can be replicated in their source zone, in a geographically diverse zone, in their source zone and one or more geographically diverse zones, etc. As an example, a Seattle zone can comprise a first chunk that can be replicated in the Seattle zone to provide data redundancy in the Seattle zone, e.g., the first chunk can have one or more replicated chunks in the Seattle zone, such as on different storage devices corresponding to the Seattle zone, thereby providing data redundancy that can protect the data of the first chunk, for example, where a storage device storing the first chunk or a replicate thereof becomes compromised, the other replicates (or the first chunk itself) can remain uncompromised. In an aspect, data replication in a zone can be on one or more storage devices, e.g., a chunk can be stored on a first data storage device, a second chunk can be stored on a second storage device, and a third chunk can be stored on a third storage device, wherein the first, second, and third storage devices correspond to the first zone, and wherein the first, second, and third storage devices can be the same storage device or different storage devices. Replication of chunks, e.g., the first chunk, into other chunks can comprise communicating data, e.g., over a network, bus, etc., to other data storage locations on the first, second, and third storage devices and, moreover, can consume data storage resources, e.g., drive space, etc., upon replication. As such, the number of replicates can be based on balancing resource costs, e.g., network traffic, processing time, cost of storage space, etc., against a level of data redundancy, e.g., how much redundancy is needed to provide a level of confidence that the data/replicated data will be available within a zone. In an aspect, replication of chunks can enable deconvolution of convolved chunks at another zone(s). Deconvolution of a convolved chunk can facilitate deletion of data from a convolved chunk. Accordingly, in deleting data, it can be desirable to reduce resource consumption, e.g., reduce replication of chunks between zones or between devices of a zone, so that less bandwidth, less storage, etc., is consumed as part of deleting data from a convolved chunk.

A geographically diverse storage system, e.g., a system comprising system 100, can replicate chunks from a first ZSC, e.g., ZSC 120, etc., at another ZSC, e.g., ZSC 110, as part of deleting the chunks and replicate data of the chunks from other chunks, e.g., in other zones. As is illustrated in system 100, chunk 122 can be replicated as chunk 125, e.g., from first ZSC 120 to second ZSC 110, such as via a network link, bus, over an internet connection, wired link, wireless link, etc. Similarly, chunk 124 can be replicated as chunk 123, e.g., from first ZSC 120 to second ZSC 110. Chunk 112 can be a convolved chunk comprising data representative of chunk 124. Chunk 114 can be a convolved chunk comprising data representative of chunk 122. Accordingly, chunk 112 can be deconvolved, e.g., by XOR with chunk 123, etc., to yield chunk 116, wherein chunk 116 can comprise data other than that represented by chunk 123. Similarly, chunk 114 can be deconvolved, e.g., by XOR with chunk 125, etc., to yield chunk 118, wherein chunk 118 can comprise data other than that represented by chunk 122.

At this point, chunks 122, 124, 123, 125, 112, and 114 can be deleted to 'delete' the data of chunk 122 and 124 from ZSCs 110 and 120 of system 100. In a further aspect, chunks 116 and 118 can be convolved into chunk 119, and chunks 116 and 118 can then be deleted, such that the data of chunks 112 and 114, other than the representations of the data from chunk 122 and 124, are preserved. The convolution of chunks 116 and 118 into 119 can result in less consumed storage space at ZSC 110, e.g., chunk 119 can be smaller than the sum of chunks 116 and 118. As will be observed, the deletion of chunks 122 and 124, including replicates of the data comprised therein via chunks 112 and 114, can comprise two inter-zone replications, e.g., replications of chunks 122 and 124 of first ZSC 120 as chunks 125 and 123, respectively, in second ZSC 110 to enable deletion of chunks 122 and 124, and deletion of replicated data comprised in chunks 112 and 114 via deconvolution at second ZSC 110, e.g., deconvolution into chunks 123 and 125, and subsequent compacting of the remaining data into chunk 119 via convolving chunks 116 and 118.

Figure 2:
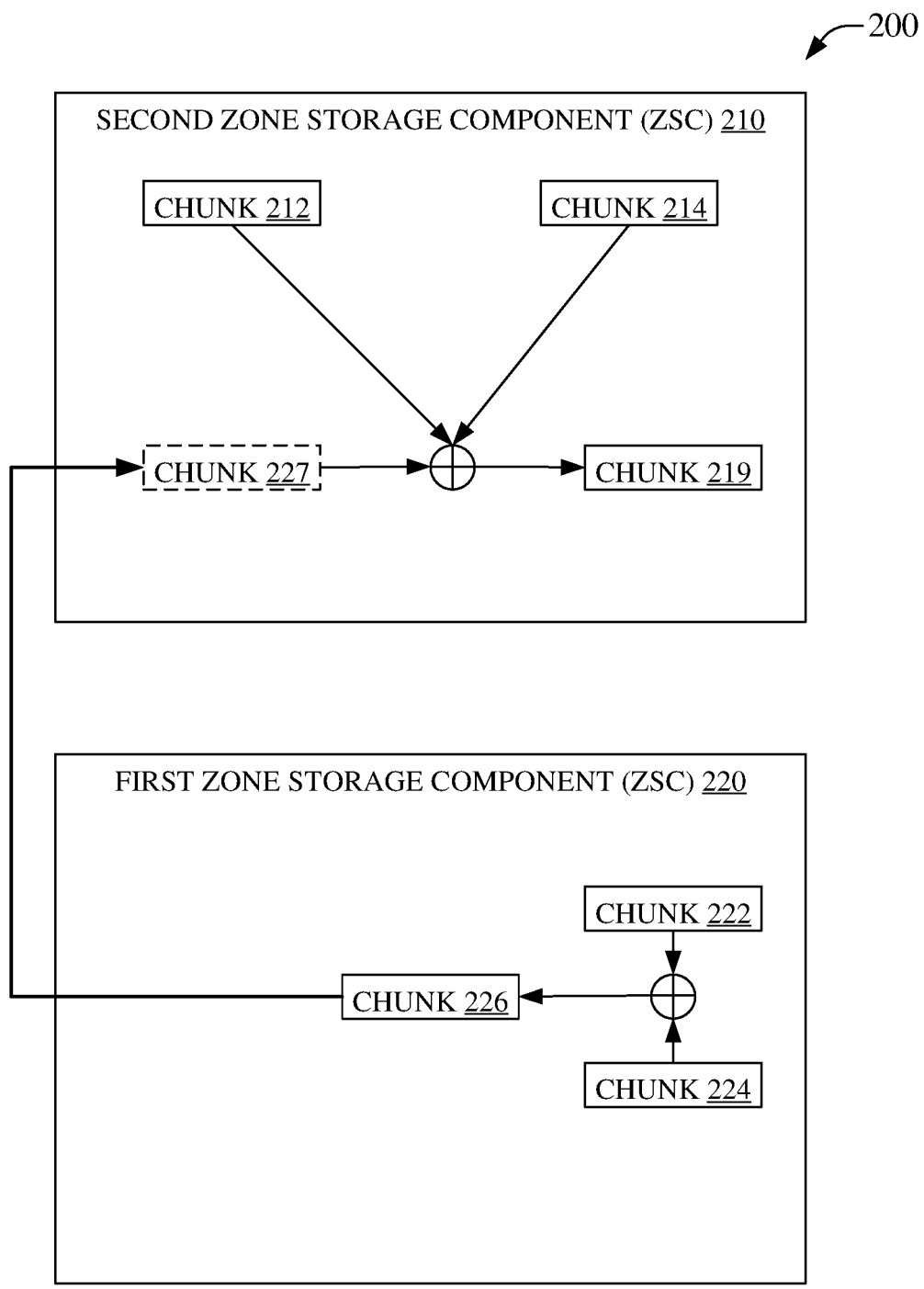
FIG. 2 is an illustration of an example system that can facilitate deleting convolved data with second inter-zone resource consumption in a geographically diverse storage construct, in accordance with aspects of the subject disclosure.

FIG. 2 is an illustration of a system 200, which can enable deleting convolved data with second inter-zone resource consumption in a geographically diverse storage construct, in accordance with aspects of the subject disclosure. System 200 can be consume less resources than example system 100, where system 100 illustrates multiple data transfers and creation of multiple replicates, system 200 can provide for fewer data transfers and fewer replicates to achieve a similar or same result. System 200, in an embodiment, can convolve chunks 222 and 224 into chunk 226 at first ZSC 220 prior to replicating chunk 226 as chunk 227 at second ZSC 210. As such, chunk 227 (and also chunk 226) can represent the data of chunks 222 and 224, and can be replicated into second ZSC 210, for example, by half the number of data transfers as was illustrated in system 100 to replicate chunks 122 and 124 into ZSC 110 as chunks 123 and 125. Moreover, chunk 226, and similarly chunk 227 can consume less storage space than the sum of space used by chunks 222 and 224, and therefore in comparison to replicates 123 and 125 of system 100, the use of chunk 227 can also consume less storage space at second ZSC 210.

Where the convolution technique used is commutative, e.g., an XOR function can be commutative, such that $A \oplus (B \oplus C) = (A \oplus B) \oplus C$, etc., the use of chunk 227 to deconvolve chunks 212 and 214 into chunk 219 can have the same or similar results as using chunks 123 and 125 to deconvolve chunks 112 and 114 into chunks 116 and 118 that can then be convolved in to chunk 119. As an example, letting chunks 112 and 212 be a convolution of chunk A and chunk G1, termed 'AG1', letting chunks 114 and 214 be a convolution of chunks B and G2, termed 'BG2', letting chunks 122 and 222 be chunks G1, and letting chunks 124 and 224 be chunks G2, then chunks 119 and 219 can be a convolution of chunks A and B, termed 'AB', e.g., where chunks G1 and G2 have been deleted via the disclosed subject matter, based on:

AB=
$(AG1 \oplus G1) \oplus (BG2 \oplus G2)=$
$AG1 \oplus G1 \oplus BG2 \oplus G2=$
$AG1 \oplus BG2 \oplus G1 \oplus G2=$
$AG1 \oplus BG2 \oplus (G1 \oplus G2)=$
$AG1 \oplus BG2 \oplus G1G2.$ Accordingly, chunks 212, 214, and 227 can be convolved to yield chunk 219 that can comprise chunk data other than a representation of data comprised in chunks 222 and 224. At this point, chunks 222, 224, 226, 212, 214, and 227 can be deleted.

Figure 3:
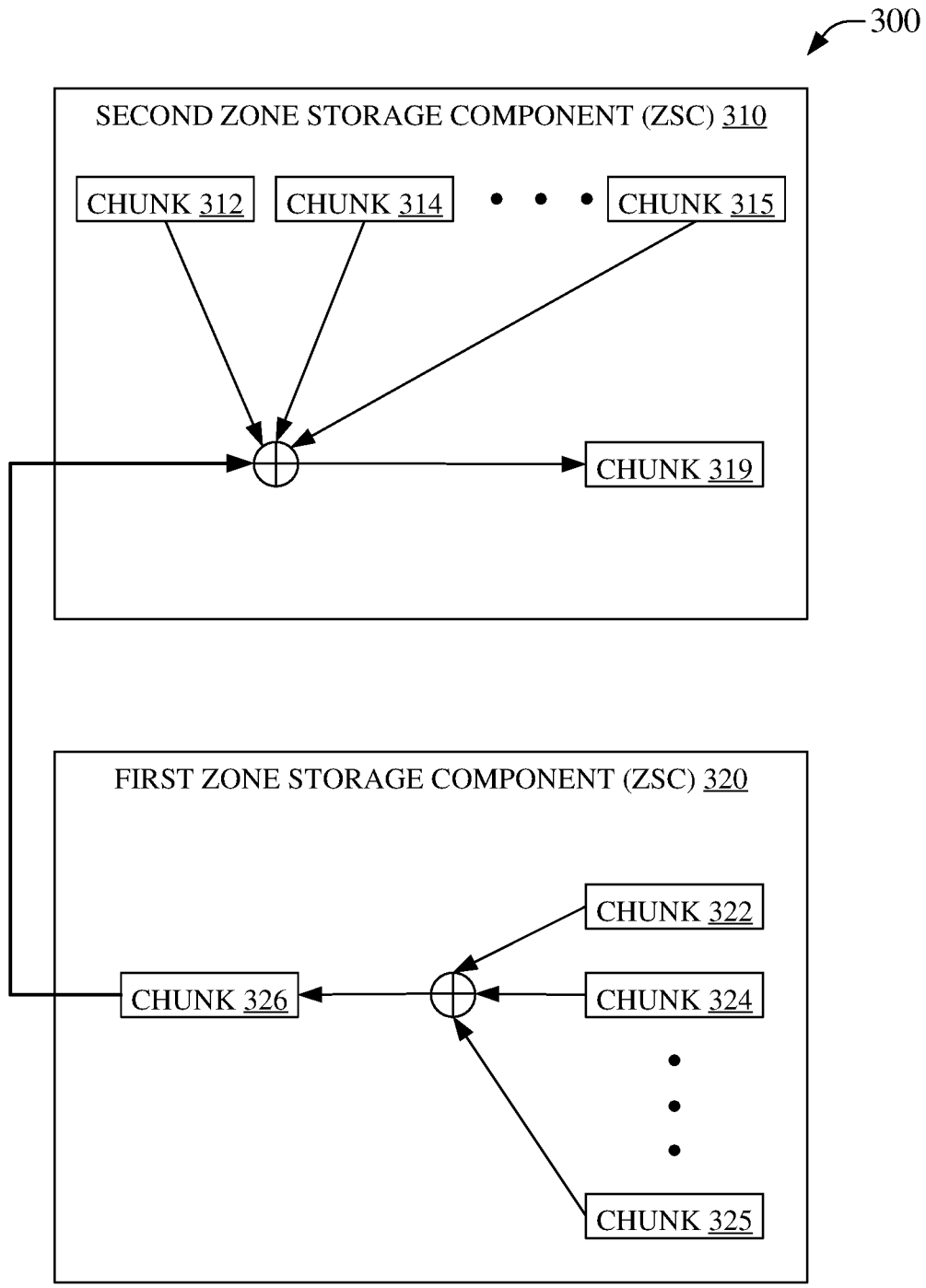
FIG. 3 is an illustration of an example system that can enable deleting convolved data with third inter-zone resource consumption in a geographically diverse storage construct, wherein the convolved data represents a group of more than two data chunks, in accordance with aspects of the subject disclosure.

FIG. 3 is an illustration of a system 300, which can facilitate deleting convolved data with third inter-zone resource consumption in a geographically diverse storage construct, wherein the convolved data represents a group of more than two data chunks, in accordance with aspects of the subject disclosure. Similar to system 200, system 300 can delete data chunks, however, system 300 illustrates that representations of data comprised in multiple data chunks from first ZSC 320, e.g., chunks 322-325, can be deleted from second ZSC 310. This, for example, can be beneficial where deletion of chunks may be batched so that there can be a larger number of chunks to be deleted in each batch rather than fewer chunks via increased numbers of delete events.

In system 300, three or more chunks, e.g., chunks 322-325, etc., can be convolved into chunk 326 in first ZSC 320. Data representing chunk 326 can be received at second ZSC 310 and be convolved with chunks 312-315 to yield chunk 319, e.g., on-arrival data compression where the data represented by chunk 326 is compressed with data from chunks 312 to 315 into chunk 319 as the data represented by chunk 326 arrives at second ZSC 310 from first ZSC 320. Chunks 312-315 can comprise data represented in chunks 322-325. In an aspect, the count of chunks 312-315 can be the same or different than the count of chunks 322-325. Similar to system 200, system 300 can achieve deletion of chunks 322-325 and representations in convolved chunks 312-315, for example, letting chunk 312 be a convolution of chunk A and chunk G1, termed 'AG1', letting chunk 314 be a convolution of chunks B and G2, termed 'BG2', and so on until letting chunk 315 be a convolution of chunks Z and Gx, termed 'ZGx', and letting chunk 322 be chunk G1, letting chunk 324 be chunk G2, and so on until letting chunk 325 by chunk Gx, then chunk 319 can be a convolution of chunks A to Z, termed 'A^Z', e.g., where chunks G1, G2, . . . Gx, termed 'G1^Gx', have been deleted via the disclosed subject matter, based on:

$A\hat{}Z=$
$(AG1 \oplus G1) \oplus (BG2 \oplus G2) \oplus \ldots \oplus (ZGx \oplus Gx)=$
$AG1 \oplus G1 \oplus BG2 \oplus G2 \oplus \ldots \oplus ZGx \oplus Gx=$ AG1⊕BG2⊕ ... ⊕ZGx⊕ ... ⊕G1⊕G2⊕ ... ⊕Gx=
AG1⊕BG2⊕ ... ⊕ZGx⊕(G1⊕G2⊕ ... ⊕+Gx)=
AG1⊕BG2⊕ ... ⊕ZGx⊕G1ˆGx.

Accordingly, chunks 312 to 315, and data representing chunk 326 can be convolved to yield chunk 319 that can comprise chunk data other than a representation of data comprised in chunks 322 to 325. At this point, chunks 322 to 325, chunk 326, and chunks 312 to 315 can be deleted.

Figure 4:
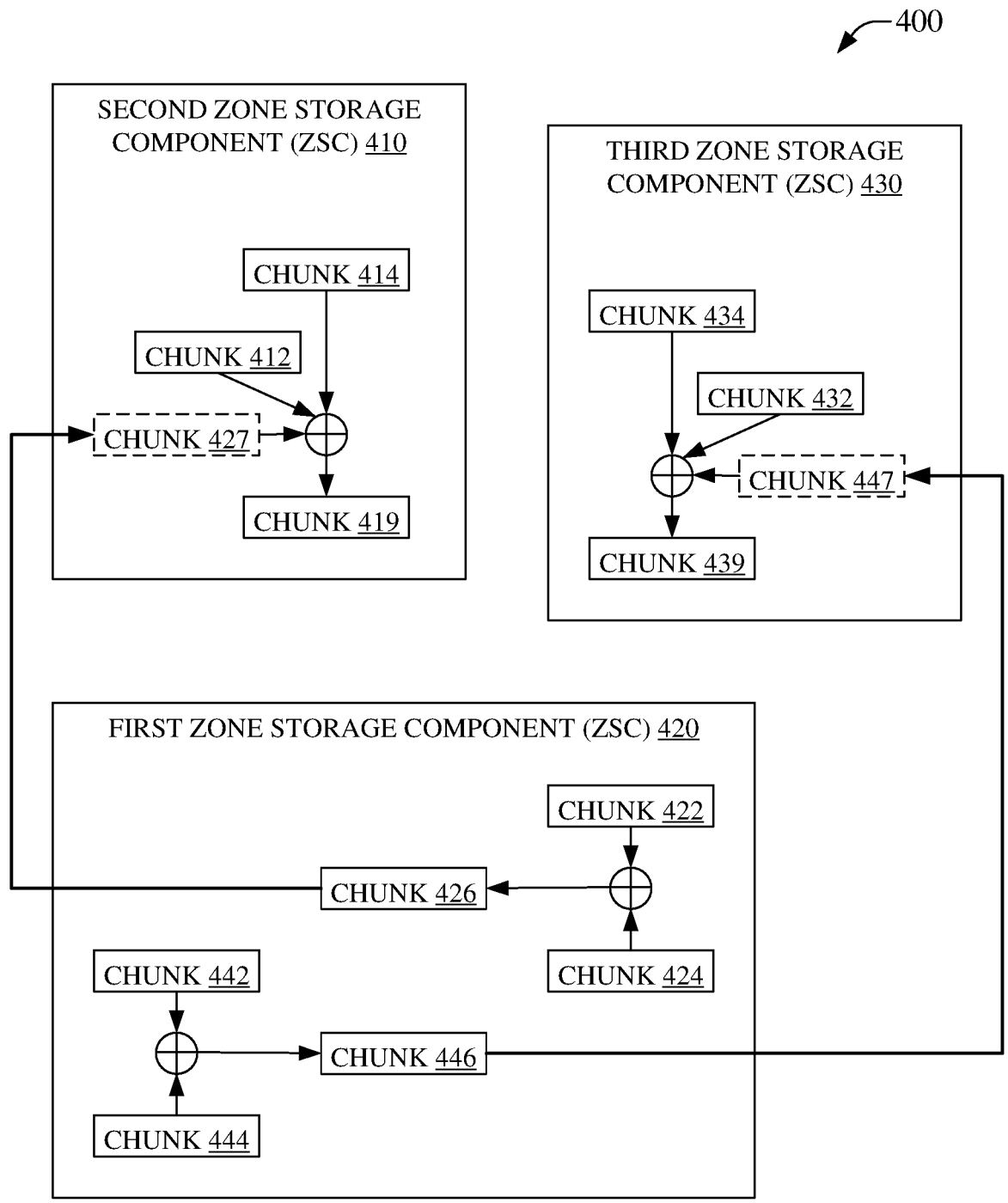
FIG. 4 illustrates an example system that can facilitate parallel deletion of convolved data from a plurality of data zones in a geographically diverse storage construct, in accordance with aspects of the subject disclosure.

FIG. 4 is an illustration of a system 400, which can enable parallel deletion of convolved data from a plurality of data zones in a geographically diverse storage construct, in accordance with aspects of the subject disclosure. System 400 can convolve chunks 422 and 424 into chunk 426 at first ZSC 420, in a manner similar to similar to system 200 and/or system 300. System 400 can further convolve chunks 442 and 444 into chunk 446 at first ZSC 420, again in a manner similar to similar to system 200 and/or system 300. Chunks 426 and 446, as illustrated, can be replicated, as chunks 427 and 447 respectively, at second and third ZSCs 410 and 430 respectively. At second ZSC 410, chunk 427 can be convolved with chunks 412 and 414 to yield chunk 419 that can comprise the data of chunks 412 and 414 other than the data represented in chunks 422 and 424. This can occur with less resource consumption than where the deletion were to occur in a manner similar to that illustrated for system 100, e.g., there are fewer data transfers than transferring data of each of chunks 422 and 424 to second ZSC 410, chunk 427 can be less demanding on storage than separate copies of chunks 422 and 424 replicated on second ZSC 410, etc. Similarly, at third ZSC 430, chunk 447 can be convolved with chunks 432 and 434 to yield chunk 439 that can comprise the data of chunks 432 and 434 other than the data represented in chunks 442 and 444. System 400 illustrates, in an aspect, parallel deletion of data from first ZSC 420 and replicate data of convolved chunks in other zones, where the convolved chunks of other zones can be in different zones of a geographically diverse storage system.

Figure 5:
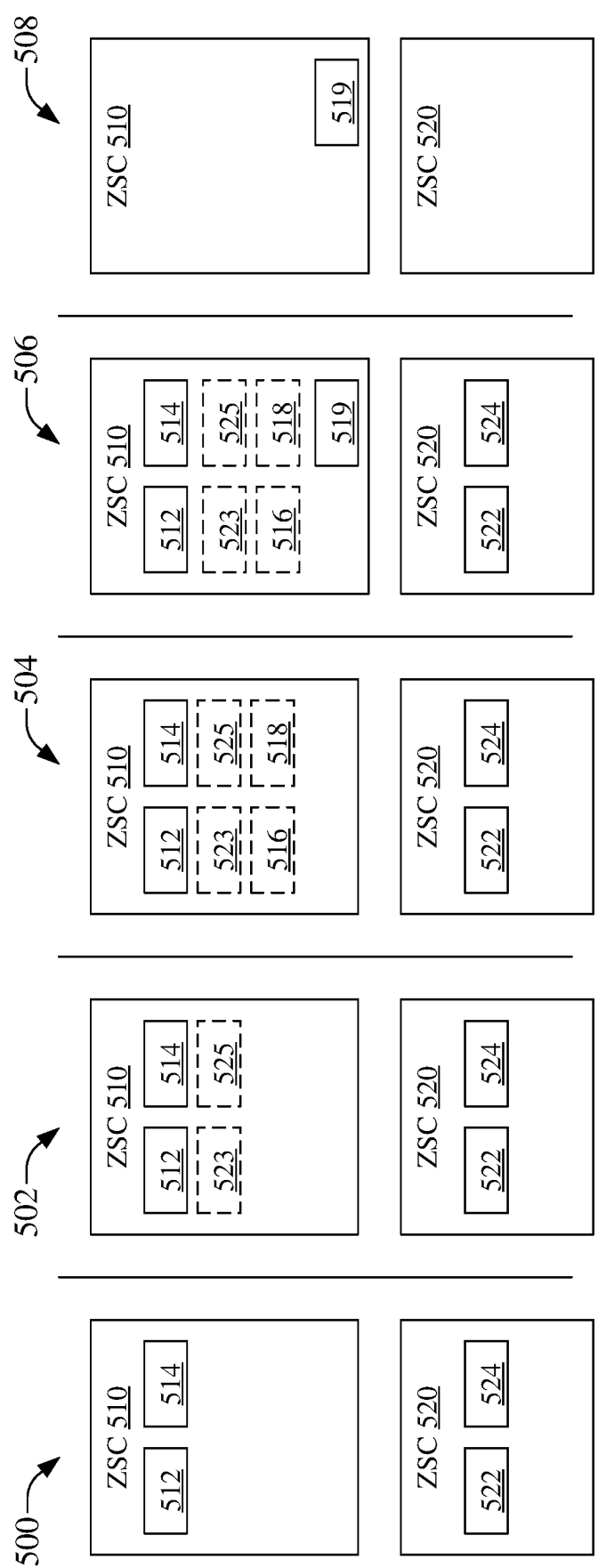
FIG. 5 is an illustration of example system states for deleting convolved data with first inter-zone resource consumption in a geographically diverse storage construct, in accordance with aspects of the subject disclosure.

FIG. 5 is an illustration of example system states, 500-508, deleting convolved data with first inter-zone resource consumption in a geographically diverse storage construct, in accordance with aspects of the subject disclosure. Example state 500 illustrates ZSC 510 comprising data chunk 512, 514, etc. Example first state 500 further illustrates that ZSC 520 can comprise data chunk 522, 524, etc. In an aspect, data chunks 512, 514, etc., can comprise data represented in chunks 522, 524, etc., respectively, e.g., chunks 512, 514, etc., can be convolved chunks that convolve at least the data represented in chunks 522, 524, etc., respectively.

At example system state 502, at least a portion of data from ZSC 520 can be received at ZSC 510, e.g., chunk 523 can be a replicate of chunk 522 and similarly, chuck 525 can be a replicate of chunk 524. In an aspect, chunks 523 and 524 can be created by data transfer between ZSCs 520 and 510.

At example state 504, chunk 512 can be convolved with chunk 523 to yield chunk 516 that can comprise the data of chunk 512 other than the data comprised in chunk 523. As an example, letting chunk 512 be a convolution of chunk A and chunk G1, termed 'AG1', letting chunk 514 be a convolution of chunks B and G2, termed 'BG2', letting chunk 522 be chunk G1, and letting chunk 524 be chunk G2, then chunk 516 can be A and chunk 518 can be B, based on A=AG1⊕G1, and B=BG2⊕G2. Then, at example state 504, chunk 516 and chunk 518 can be convolved to yield chunk 519. Subsequently, at example state 508, chunks 522, 524, 512, 514, 523, 525, 516, and 518 can be deleted with chunk 519 comprising the data represented by chunks 512 and 514 other than the data represented by chunks 522 and 524.

Figure 6:
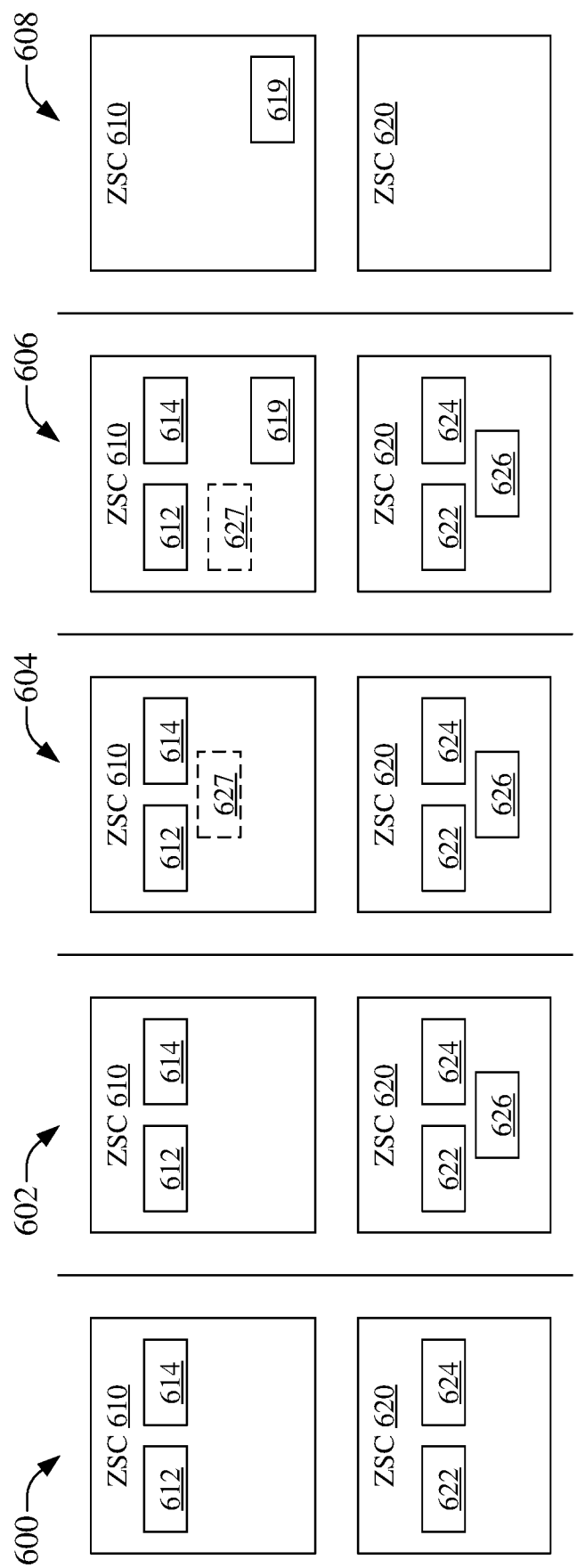
FIG. 6 is an illustration of example system states for deleting convolved data with second inter-zone resource consumption in a geographically diverse storage construct, in accordance with aspects of the subject disclosure.

FIG. 6 is an illustration of example system states, 600-608, deleting convolved data with second inter-zone resource consumption in a geographically diverse storage construct, in accordance with aspects of the subject disclosure. Example first state 600 illustrates ZSC 610 comprising data chunk 612, 614, etc. Example first state 600 further illustrates that ZSC 620 can comprise data chunk 622, 624, etc. In an aspect, data chunks 612, 614, etc., can comprise data represented in chunks 622, 624, etc., respectively, e.g., chunks 612, 614, etc., can be convolved chunks that convolve at least the data represented in chunks 622, 624, etc., respectively. At example system state 602, chunks 622 and 624 can be convolved at ZSC 620 to yield chunk 626. Chunk 626 can therefore comprise the data represented in chunks 622 and 624 in a convolved manner.

At example state 604, at least a portion of data from ZSC 620 can be received at ZSC 610, e.g., chunk 627 can be a replicate of chunk 626. In an aspect, chunks 627 can be created from chunk 626 by data transfer between ZSCs 620 and 610.

At example state 606, chunks 612, 614, etc., can be convolved with chunk 627 to yield chunk 619 that can comprise the data of chunks 612 and 614 other than the data comprised in chunk 627, e.g., other than the data comprised in chunks 622, 624, etc. As an example, letting chunk 612 be a convolution of chunk A and chunk G1, termed 'AG1', letting chunk 614 be a convolution of chunks B and G2, termed 'BG2', letting chunk 622 be chunk G1, and letting chunk 624 be chunk G2, then chunk 619 can be chunk AB, based on:

AB=
(AG1⊕G1)⊕(BG2⊕G2)=
AG1⊕G1⊕BG2⊕G2=
AG1⊕BG2⊕G1⊕G2=
AG1⊕BG20⊕(G10⊕G2)=
AG1⊕BG2⊕G1G2.

At example state 608, chunks 622, 624, 626, 612, 614, and 627 can be deleted wherein chunk 619 comprises the data represented by chunks 612 and 614 other than the data represented by chunks 622 and 624.

Figure 7:
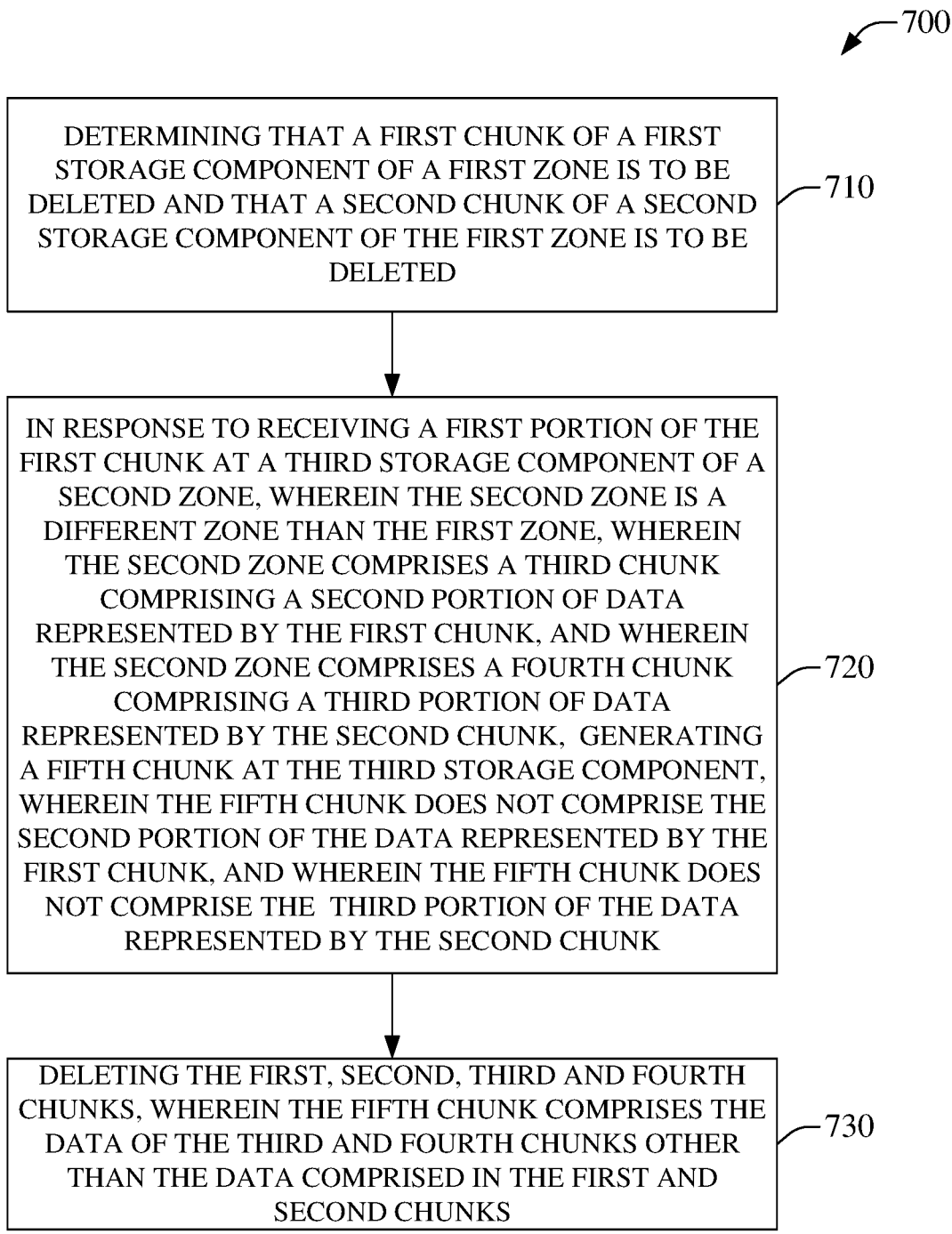
FIG. 7 is an illustration of an example method facilitating deletion of convolved data with first inter-zone resource consumption in a geographically diverse storage construct, in accordance with aspects of the subject disclosure.
Figure 8:
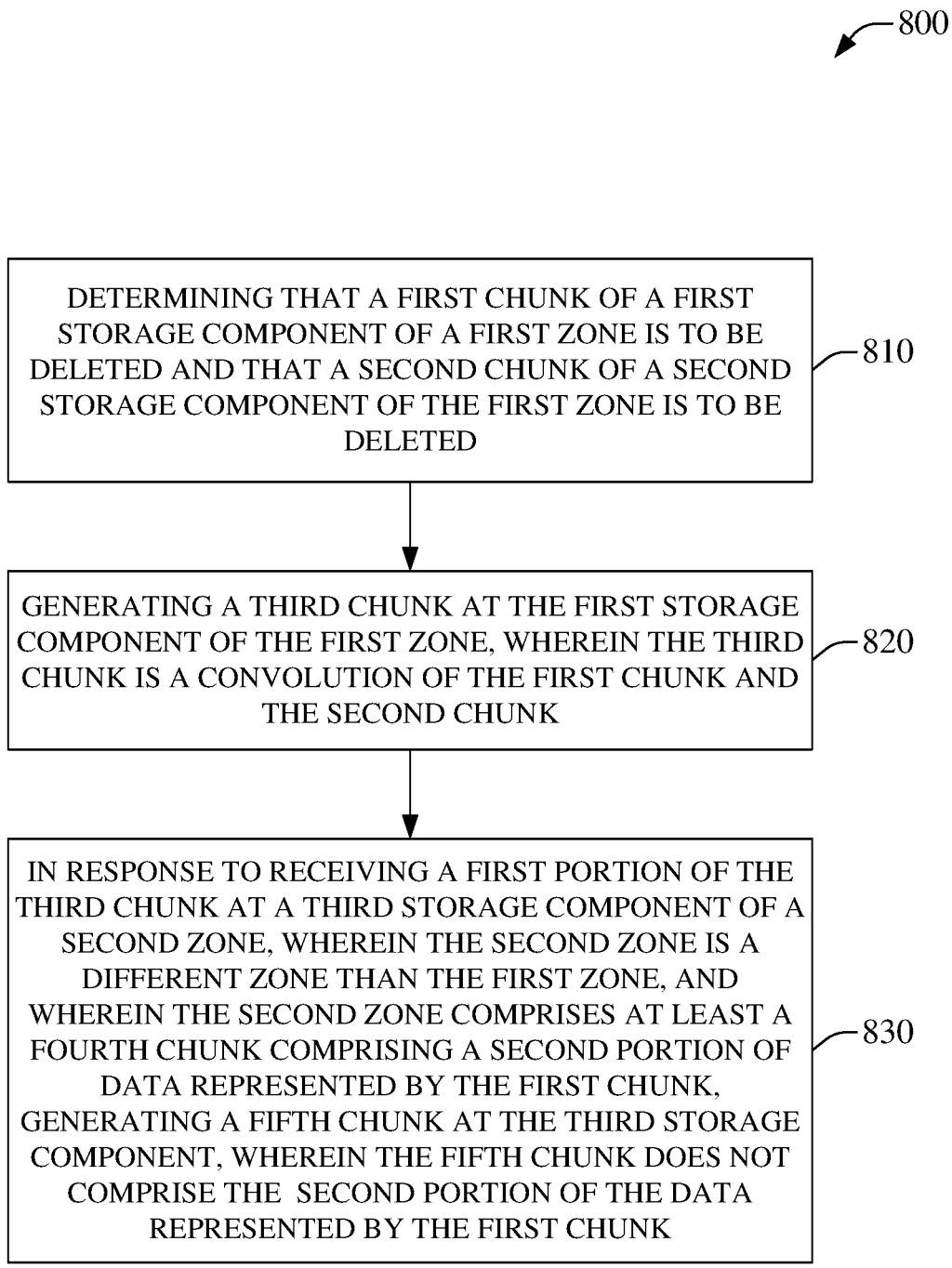
FIG. 8 illustrates an example method that enables deletion of convolved data with second inter-zone resource consumption in a geographically diverse storage construct, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, which can facilitate deletion of convolved data in a geographically diverse storage construct, in accordance with aspects of the subject disclosure. At 710, method 700 can comprise determining that a first and a second chunk are to be deleted from a first zone of a geographically diverse storage system. In an embodiment, the first chunk can be stored on a first storage device of the first zone and the second chunk can be stored on a second storage device of the first zone. In other embodiments, the first and second chunks can be stored on the same storage device of the first zone. In an aspect, additional chunks to be deleted can be stored on the same or different storage devices of the first zone, for example, the plurality of chunks illustrated in first ZSC 320 of system 300, etc.

At 720, data represented in the first and second chunks can be received at a second zone. The second zone can comprise a third and fourth chunk. The third chunk can comprise data represented in the first chunk, e.g., the third chunk can be a convolved chunk comprising data represented in the first chunk. Similarly, the fourth chunk can comprise data represented in the second chunk. In response to receiving a first portion of the first chunk and a second portion of the second chunk data at the second zone, a fifth chunk can be generated at the second zone. The fifth chunk can comprise the data of the third and fourth chunks other than the data represented in the first and second chunks. In some embodiments, the receiving the first and second chunks can comprise creating a local copy of the first and second chunks at the second zone, e.g., on a third storage component of the second zone, etc. In other embodiments, the receiving the first and second chunks can comprise on-arrival use of the incoming data represented in the first and second chunks to generate the fifth chunk at the second zone. In an aspect the first and second zones can be different zones.

At 730, the first, second, third, and fourth chunks, and any local replicates of the first and second chunks, can be deleted from their respective zones. At this point method 700 can end. This can result in the fifth chunk remaining, which typically results in use of less storage space than was previously consumed by the storage of the third and the fourth chunks. Similarly, the storage space previously used by the first and second chunks can also be released for other use. In some embodiments, the portion of the first chunk and the second portion of the second chunk can be received at the second zone at different times, e.g., the first chunk can be determined as ready to be deleted and can be replicated at the second zone prior to the determining that the second chunk is to be deleted and corresponding reception of a portion of the second chunk at the second zone.

FIG. 8 is an illustration of an example method 800, which can enable daisy-chain deletion of convolved data from a plurality of data zones in a geographically diverse storage construct, in accordance with aspects of the subject disclosure. At 810, method 800 can comprise determining that a first and a second chunk are to be deleted from a first zone of a geographically diverse storage system. In an embodiment, the first chunk can be stored on a first storage device of the first zone and the second chunk can be stored on a second storage device of the first zone. In other embodiments, the first and second chunks can be stored on the same storage device of the first zone. In an aspect, additional chunks to be deleted can be stored on the same or different storage devices of the first zone, for example, the plurality of chunks illustrated in first ZSC 320 of system 300, etc.

At 820, a third chunk can be generated at the first storage component of the first zone. The third chunk can be a convolution of the first and second chunks. As an example, where the first chunk is G1 and the second chunk is G2, the third chunk can be G1 XOR G2, e.g., 'G1G2'.

At 830, in response to receiving a first portion of the third chunk at a third storage component of a second zone, a fifth chunk can be generated. At this point, method 800 can end. The fifth chunk can be a convolution of the third chunk and at least a fourth chunk stored on the third storage component of the second zone. In an aspect, the fourth chunk can comprise data represented in the first chunk, e.g., the fourth chunk can be a convolution of other data and the data of the first chunk. In some embodiments, the third chunk can further comprise a sixth chunk that can be a convolution of the second chunk and other data. Moreover, in some of these embodiments, the fifth chunk can be based on the third fourth and sixth chunks and, therefore, can represent the data of the fourth and sixth chunks other than the data of the first and second chunks.

Figure 9:
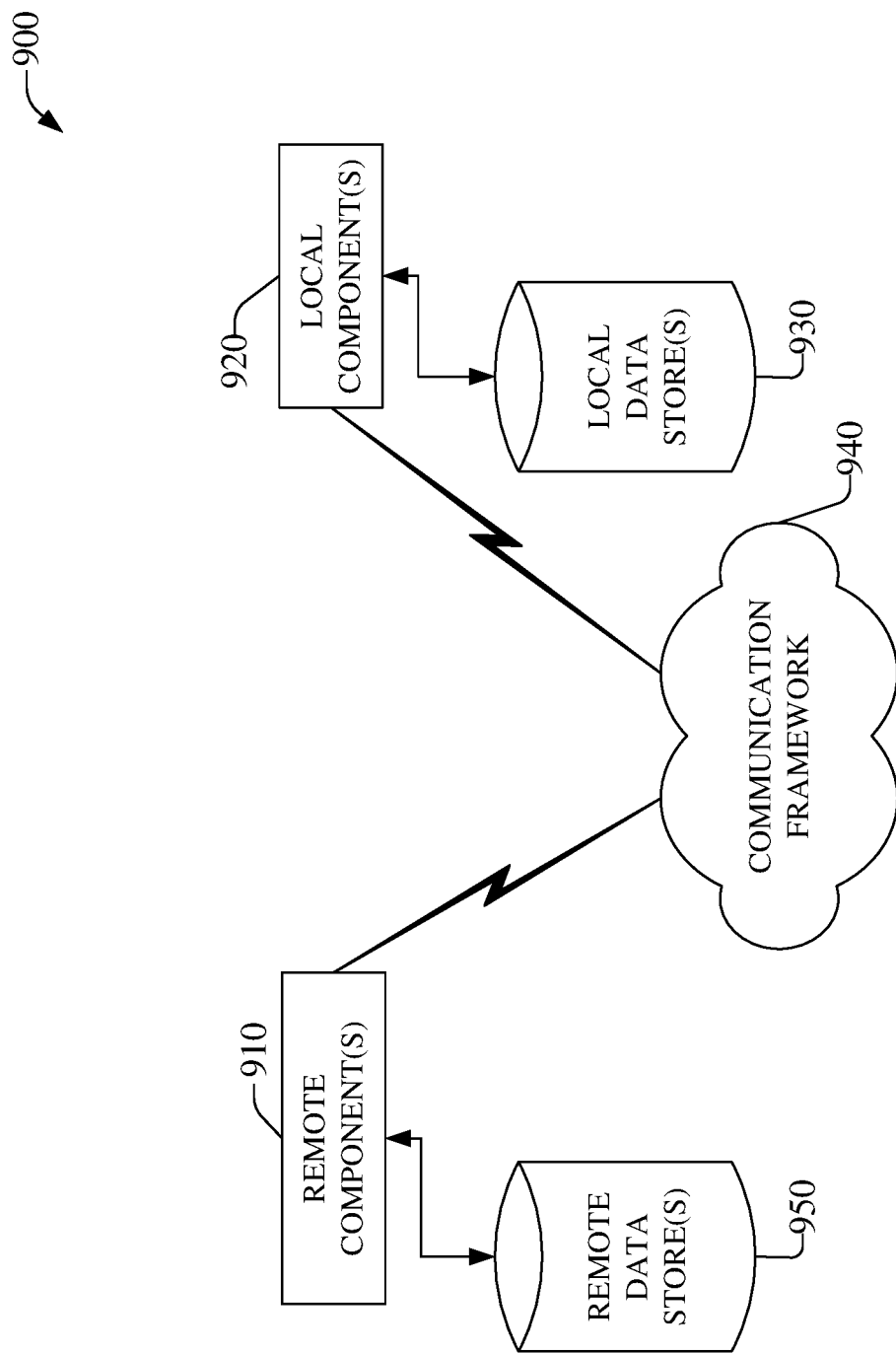
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located ZSC connected to a local ZSC via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local ZSC connected to a remote ZSC via communication framework 940. In an aspect the remotely located ZSC or local ZSC can be embodied in ZSC 110, 120, 210, 220, 310, 320, 410-430, 510, 520, 610, 620, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, information corresponding to chunks stored on ZSCs can be communicated via communication framework 940 to other ZSCs of a storage network, e.g., to facilitate compression, storage in partial or complete chunks, deletion of chunks, etc., on/from a ZSC as disclosed herein.

Figure 10:
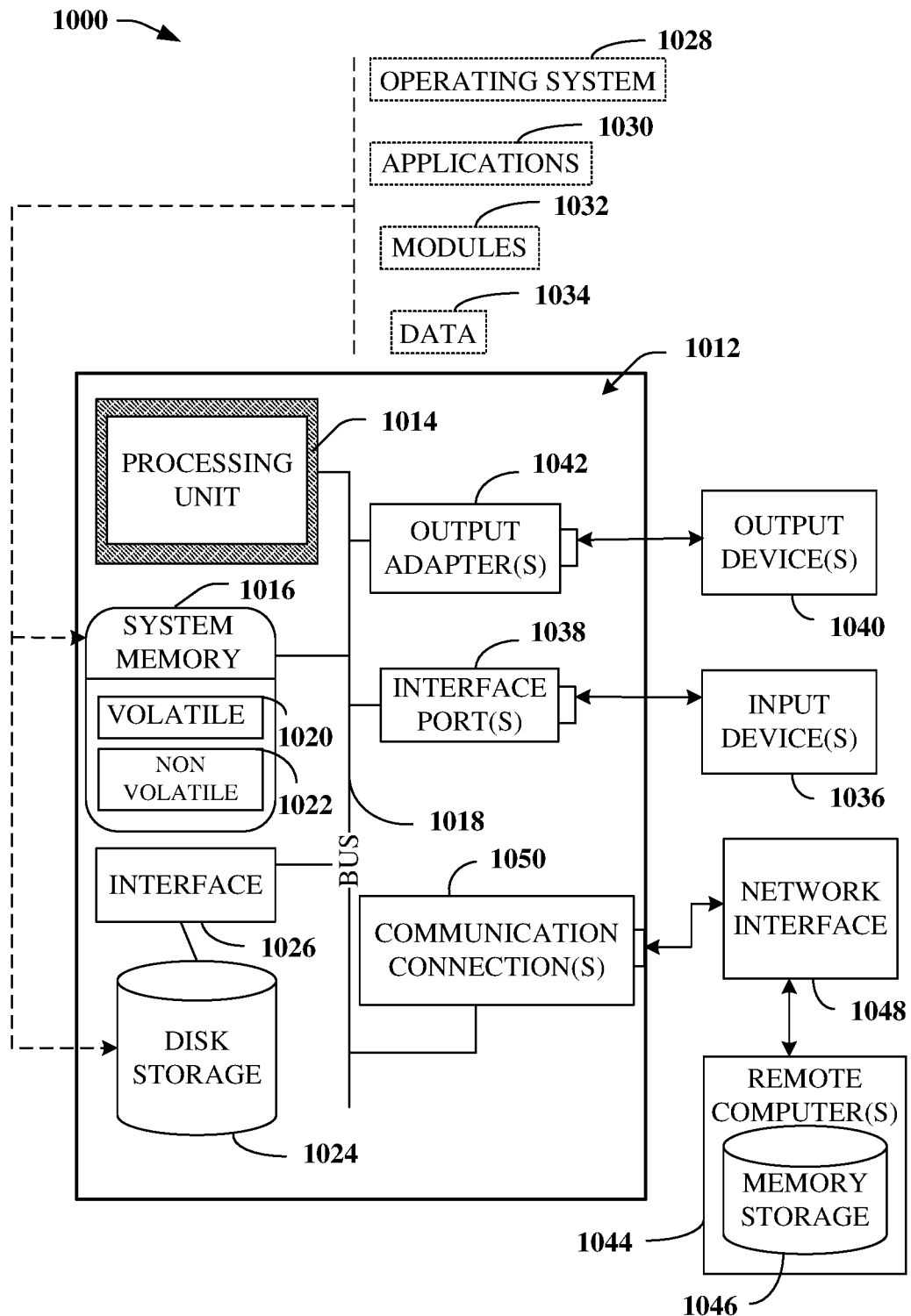
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a ZSC 110, 120, 210, 220, 310, 320, 410-430, 510, 520, 610, 620, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising deleting a chunk and a corresponding portion of a compressed chunk from a ZSC, e.g., ZSC 110, 120, 210, 220, 310, 320, 410-430, 510, 520, 610, 620, etc., as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving a first portion of first data comprised in a first chunk from a first zone storage component of a first zone of a distributed storage system that comprises zones in at least different cities, wherein the first chunk is immutable, and wherein the first portion is received at a second zone of the distributed storage system, and wherein the second zone comprises a third chunk that is immutable and comprises first chunk data represented in the first chunk;
receiving a second portion of second data comprised in a second chunk from a second zone storage component of the first zone of the distributed storage system, wherein the second chunk is immutable, and wherein the second portion is received at the second zone, and wherein the second zone comprises a fourth chunk that is immutable and comprises second chunk data represented in the second chunk; and
generating, at the second zone of the distributed storage system, a fifth chunk that is immutable based on the first portion of the first data and the third chunk, wherein the fifth chunk comprises third chunk data represented in the third chunk other than the first chunk data represented in the first chunk.

2. The system of claim 1, wherein the first zone is a different zone than the second zone.

3. The system of claim 1, wherein the operations further comprise, in response to the generating the fifth chunk, initiating deletion of the first and third.

4. The system of claim 1, wherein the receiving the first portion comprises generating a sixth chunk at the second zone, wherein the receiving the second portion comprises generating a seventh chunk at the second zone, and wherein the generating the fifth chunk is based on the first portion, via the sixth chunk, and the second portion, via the seventh chunk.

5. The system of claim 1, wherein the receiving the first portion and the second portion at the second zone is via a third portion of data represented in a sixth chunk generated in the first zone of the geographically distributed storage system, and wherein the sixth chunk is a convolution of the first chunk and the second chunk.

6. The system of claim 5, wherein the sixth chunk results from an XOR combination of the first and second chunk.

7. The system of claim 5, wherein the operations further comprise, in response to the generating the fifth chunk, initiating deletion of the first, third, and sixth chunks.

8. The system of claim 1, wherein the first zone storage component is a different storage component than the second zone storage component.

9. The system of claim 1, wherein the first zone storage component and the second zone storage component are a same storage component.

10. The system of claim 1, wherein the generating the fifth chunk is further based on the second portion of the second data and the fourth chunk, and wherein the fifth chunk further comprises fourth chunk data represented by the fourth chunk other than the second chunk data represented by the second chunk.

11. A method, comprising:
receiving, by a system comprising a processor and a memory, a first portion of first data comprised in a first chunk that is immutable and stored via a first zone storage component of a first zone of a distributed storage system comprising zones in different metropolitan areas, wherein the receiving the first portion is via a second zone of the distributed storage system, and wherein the second zone comprises a third chunk that is immutable and comprises first chunk data represented in the first chunk;
receiving, by the system, a second portion of second data comprised in a second chunk that is immutable and stored via a second zone storage component of the first zone of the distributed storage system, wherein the receiving the second portion is via the second zone, and wherein the second zone comprises a fourth chunk that is immutable and comprises second chunk data represented in the second chunk; and generating, by the system, a fifth chunk based on the first portion of the first data and the third chunk, wherein the fifth chunk comprises third chunk data represented in the third chunk other than the first chunk data represented in the first chunk.

12. The method of claim 11, wherein the receiving the first portion comprises generating a sixth chunk at the second zone, wherein the receiving the second portion comprises generating a seventh chunk at the second zone, and wherein the generating the fifth chunk is based on the first portion, via the sixth chunk, and the second portion, via the seventh chunk.

13. The method of claim 11, wherein the receiving the first portion and the second portion at the second zone is via a third portion of data represented in a sixth chunk generated, by the system, in the first zone of the geographically distributed storage system, and wherein the sixth chunk is a convolution of the first chunk and the second chunk.

14. The method of claim 13, wherein generating the sixth chunk is via XOR combining the first and second chunk.

15. The method of claim 11, further comprising, in response to the generating the fifth chunk, initiating, by the system, a deletion of the first and third chunks.

16. A non-transitory machine-readable medium, comprising executable instructions that, when executed by a processor, facilitate performance of operations, comprising:

receiving a first portion of first data comprised in a first chunk from a first zone storage component of a first zone of a distributed storage system, wherein the first chunk is immutable, wherein the first zone corresponds to a first municipality, wherein the receiving the first portion is via a second zone of the distributed storage system, wherein the second zone corresponds to a second municipality different than the first municipality, and wherein the second zone comprises a third chunk that is immutable and that comprises first chunk data represented in the first chunk;

receiving a second portion of second data comprised in a second chunk from a second zone storage component of the first zone of the distributed storage system, wherein the second chunk is immutable, wherein the receiving the second portion is via the second zone, and wherein the second zone comprises a fourth chunk that is immutable and that comprises second chunk data represented in the second chunk; and generating a fifth chunk based on the first portion of the first data and the third chunk, wherein the fifth chunk comprises third chunk data represented in the third chunk other than the first chunk data represented in the first chunk.

17. The non-transitory machine-readable medium of claim 16, wherein the receiving the first portion triggers generating a sixth chunk comprising the first portion at the second zone, wherein the receiving the second portion triggers generating a seventh chunk comprising the second portion at the second zone, and wherein the generating the fifth chunk is based on the first portion and the second portion.

18. The non-transitory machine-readable medium of claim 16, wherein the receiving the first portion and the second portion at the second zone is via a third portion of data represented in a sixth chunk generated in the first zone of the geographically distributed storage system, and wherein the sixth chunk is a convolution of the first chunk and the second chunk.

19. The non-transitory machine-readable medium of claim 18, wherein the convolution of the first chunk and the second chunk comprises an XOR operation.

20. The non-transitory machine-readable medium of claim 16, wherein the operations further comprise, in response to the generating the fifth chunk, initiating deletion of the first and third, chunks.

* * * * *